(No Model.)
A. H. POTTER.
WATCH.
No. 360,819. Patented Apr. 5, 1887.
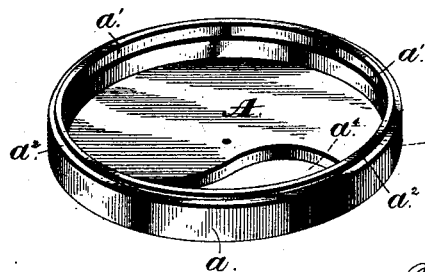
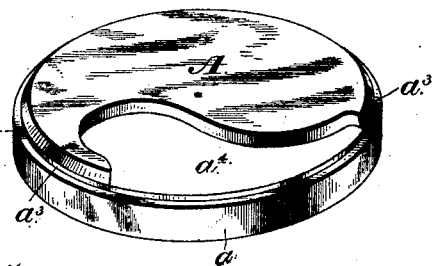
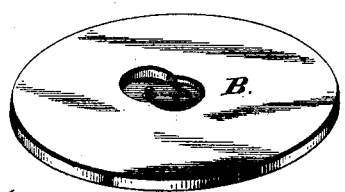
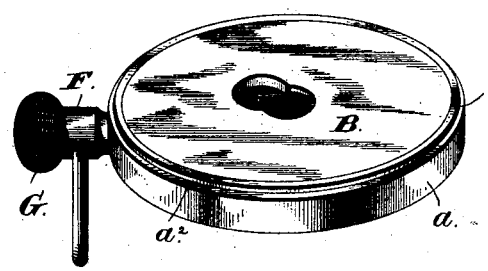
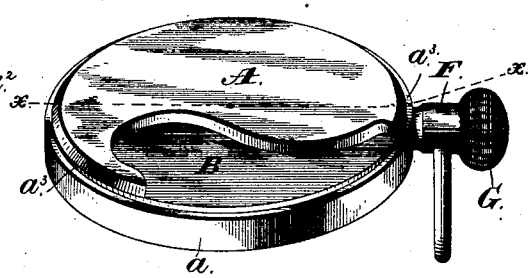
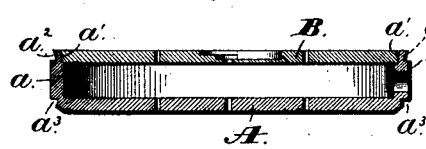
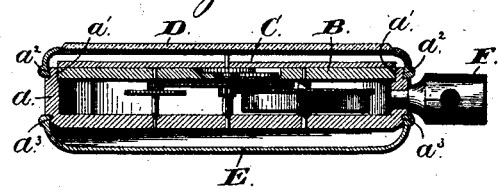
Witnesses:
Jas. E. Hutchinson.
Henry C. Hazard.
Inventor:
Albert H. Potter, by
Prindle & Russell, his Attys.

UNITED STATES PATENT OFFICE.

ALBERT H. POTTER, OF GENEVA, SWITZERLAND, ASSIGNOR TO THE NEW HAVEN WATCH COMPANY, OF NEW JERSEY.

WATCH.

SPECIFICATION forming part of Letters Patent No. 360,819, dated April 5, 1887.

Application filed August 26, 1886. Serial No. 211,880. (No model.)

*To all whom it may concern:*

Be it known that I, ALBERT H. POTTER, of Geneva, in the Republic of Switzerland, have invented certain new and useful Improvements in Watches; and I do hereby declare that the following is a full, clear, and exact description thereof, reference being had to the accompanying drawings, in which—

Figure 1 is a perspective view, from the front, of my combined case-center and rear movement-plate. Fig. 2 is a like view of the same from the rear. Fig. 3 is a perspective view of the front movement-plate. Figs. 4 and 5 are like views, from the front and rear, respectively, of said parts and the pendant as combined for use. Fig. 6 is a section upon line *x x* of Fig. 5, and Fig. 7 is a like view of the watch complete.

Letters of like name and kind refer to like parts in each of the figures.

The design of my invention is to simplify the construction and lessen the expense invovled in the construction of watches; and to this end said invention consists, principally, as an improvement in watches, in a combined rear movement-plate and case-center which upon opposite sides is adapted to receive a glass-bezel and case-back, substantially as and for the purpose hereinafter specified.

It consists, further, as an improvement in watches, in a combined rear movement-plate and case-center which upon its front side is adapted to receive a front movement-plate and glass-bezel and upon its rear side to receive a case-back, substantially as and and for the purpose hereinafter shown.

It consists, further, as an improvement in watches, in a combined rear movement-plate and case-center which upon its front side is adapted to receive a front movement-plate and glass-bezel, upon its rear side is adapted to receive a case-back, and within its periphery is adapted to receive a pendant, substantially as and for the purpose hereinafter set forth.

It consists, further, as an improvement in watches, in a combined rear movement-plate and case-center which is provided within its front side with a peripheral rabbet and within its rear edge with a second peripheral rabbet, in combination with a glass-bezel and a case-back, substantially as and for the purpose hereinafter shown and described.

It consists, further, as an improvement in watches, in a combined rear movement-plate and case-center which is provided within its front side with an inner and an outer peripheral rabbet, and within its rear side with a third peripheral rabbet, in combination with a front movement-plate, a glass-bezel, and a case-back, substantially as and for the purpose hereinafter specified.

It consists, further, as an improvement in watches, in a combined rear movement-plate and case-center which is adapted to receive upon its front side a front movement-plate, a dial, and a glass-bezel, and upon its rear side a case-back, substantially as and for the purpose hereinafter shown.

It consists, further, as an improvement in watches, in a combined rear movement-plate and case-center which is provided within its front side with an inner and an outer peripheral rabbet and within its rear side with a third peripheral rabbet, in combination with a front movement-plate, a dial, a glass-bezel, and a case-back, substantially as and for the purpose hereinafter set forth.

It consists, further, as an improvement in watches, in a combined rear movement-plate and case-center which is adapted to receive upon its front side a front movement-plate, a dial, and a glass-bezel, and upon its rear side a case-back, in combination with said parts and with a time-train, substantially as and for the purpose hereinafter shown and described.

It consists, further, as an improvement in watches, in a combined rear movement-plate and case-center which is adapted to receive upon its front side a front movement- plate, a dial, and a glass-bezel, and upon its rear side a case-back, in combination with said parts, and with a pendant, substantially as and for the purpose hereinafter specified.

It consists, finally, in a watch in which the rear movement-plate and case-center are constructed from one piece and are combined with a front movement-plate, a dial, a glass-bezel, a case-back, a pendant, and a time-train, substantially as and for the purpose hereinafter shown.

In the carrying of my invention into practice I employ a plate of sheet metal, A, and around its periphery form, preferably by means of dies, an upturned flange, $a$. Said plate has such size as to adapt it for use as the rear movement-plate of a watch, and said flange is adapted for use as a case-center. The plate A is now placed within a lathe, and its faces, together with the flange $a$, are dressed off, and there is cut within the inner and outer corners of said flange two peripheral rabbets, $a'$ and $a^2$, respectively, while a third rabbet, $a^3$, is cut within the corner of the outer rear side of said plate, after which there is cut within the latter an opening, $a^4$, that has the general shape shown, and serves to expose the balance-wheel and escapement of the time-train.

Within the rabbet $a'$ is fitted a front movement-plate, B, which closely fills the same, and is screwed in place by screws, or any means usually employed for such purpose. Between said plate and the plate A are journaled the parts of a train that has any desired construction to adapt it to the purpose intended, while upon the outer face of said plate B is secured a dial, C, and outside of the same are provided the usual time-marking hands.

The rabbet $a^2$ receives and contains a glazed bezel, D, which incloses the front side of the case, while the rear rabbet, $a^3$, is engaged by a back cover, E, all of usual construction. A pendant, F, secured within and projecting from one point of the periphery of the case-center $a$, which contains the usual stem-arbor and crown, G, completes the watch.

It will be seen that as constructed the watch possesses a smaller number of parts than does an ordinary watch, and that the cost of constructing the combined case and movement frame is materially less than would be practicable were they made separately and afterward combined.

The combined movement-plate and case-center shown are not claimed, broadly, herein, as the same is covered by a separate application for patent, Serial No. 168,586.

Having thus described my invention, what I claim is—

1. As an improvement in watches, a combined rear movement-plate and case-center which upon opposite sides is adapted to receive a glass-bezel and case-back, substantially as and for the purpose specified.

2. As an improvement in watches, a combined rear movement-plate and case-center which upon its front side is adapted to receive a front movement-plate and glass-bezel and upon its rear side to receive a case-back, substantially as and for the purpose shown.

3. As an improvement in watches, a combined rear movement-plate and case-center which upon its front side is adapted to receive a front movement-plate and glass-bezel, upon its rear side is adapted to receive a case-back, and within its periphery is adapted to receive a pendant, substantially as and for the purpose set forth.

4. As an improvement in watches, a combined rear movement-plate and case-center which is provided within its front side with a peripheral rabbet and within its rear edge with a second peripheral rabbet, in combination with a glass-bezel and a case-back, substantially as and for the purpose shown and described.

5. As an improvement in watches, a combined rear movement-plate and case-center which is provided within its front side with an inner and an outer peripheral rabbet and within its rear side with a third peripheral rabbet, in combination with a front movement-plate, a glass-bezel, and a case-back, substantially as and for the purpose specified.

6. As an improvement in watches, a combined rear movement-plate and case-center which is adapted to receive upon its front side a front movement-plate, a dial, and a glass-bezel, and upon its rear side a case-back, substantially as and for the purpose shown.

7. As an improvement in watches, a combined rear movement-plate and case-center which is provided within its front side with an inner and an outer peripheral rabbet and within its rear side with a third peripheral rabbet, in combination with a front movement-plate, a dial, a glass-bezel, and a case-back, substantially as and for the purpose set forth.

8. As an improvement in watches, a combined rear movement-plate and case-center which is adapted to receive upon its front side a front movement-plate, a dial, and a glass-bezel, and upon its rear side a case-back, in combination with said parts and with a time-train, substantially as and for the purpose shown and described.

9. As an improvement in watches, a combined rear movement-plate and case-center which is adapted to receive upon its front side a front movement-plate, a dial, and a glass-bezel, and upon its rear side a case-back, in combination with said parts and with a pendant, substantially as and for the purpose specified.

10. A watch in which the rear movement-plate and case-center are constructed from one piece and are combined with a front movement-plate, a dial, a glass-bezel, a case-back, a pendant, and a time-train, substantially as and for the purpose shown.

In testimony that I claim the foregoing I have hereunto set my hand this 31st day of July, A. D. 1886.

ALBERT H. POTTER.

Witnesses:
GEO. S. PRINDLE,
HENRY C. HAZARD.